Dec. 22, 1959　　　　TATUO NOJIRI　　　　2,917,968
FIELD CHANGING MEANS FOR VIEWFINDER
Filed May 23, 1956　　　　　　　　　　　3 Sheets-Sheet 1
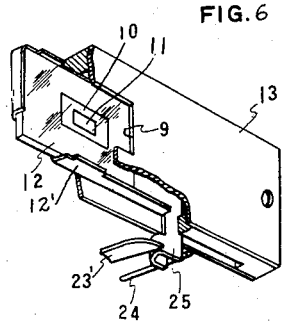
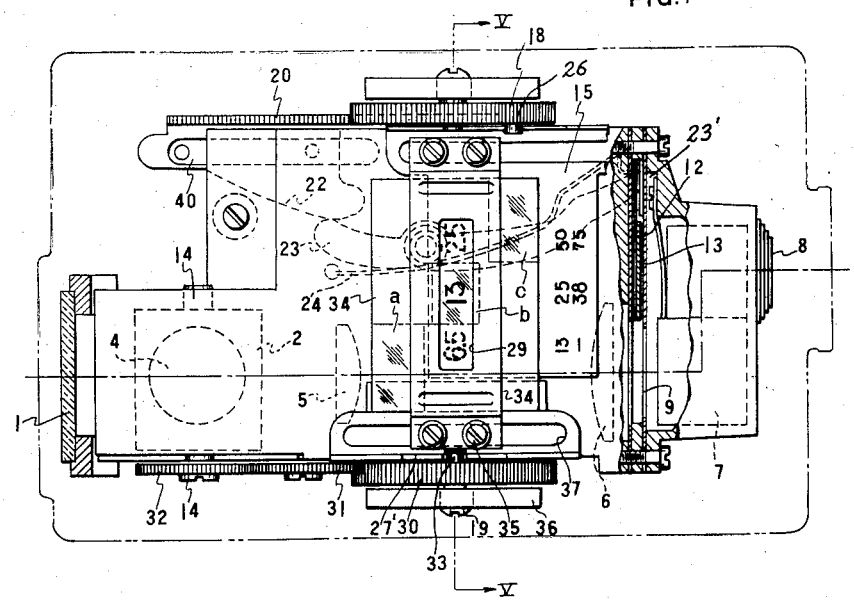
INVENTOR.
TATUO NOJIRI
BY
ATTORNEY

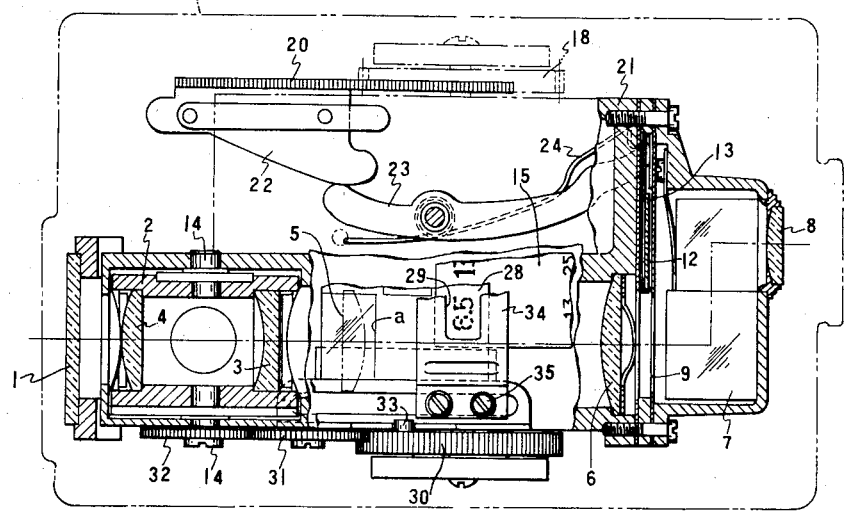
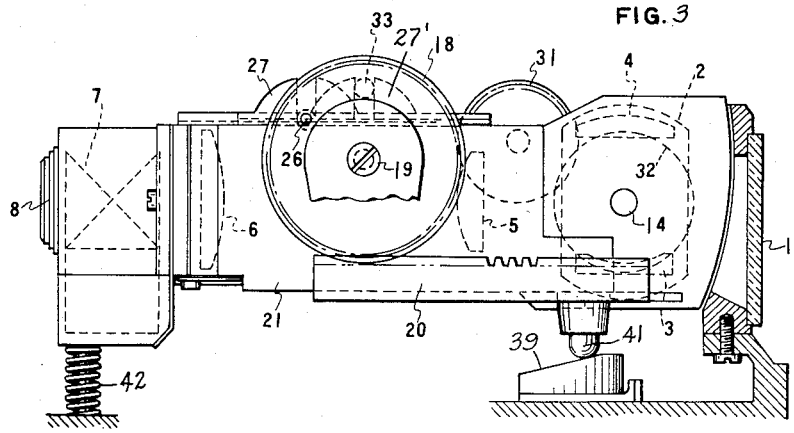
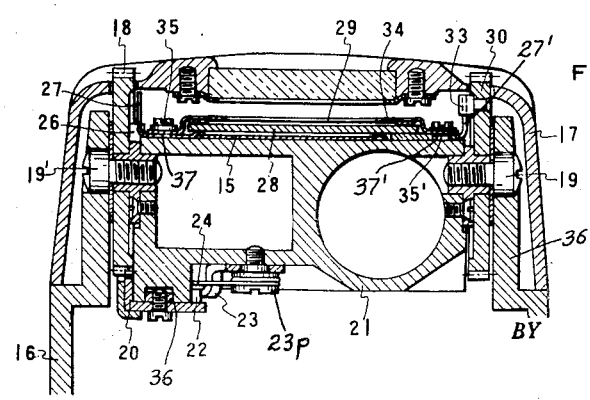

Dec. 22, 1959  TATUO NOJIRI  2,917,968
FIELD CHANGING MEANS FOR VIEWFINDER
Filed May 23, 1956  3 Sheets-Sheet 3

INVENTOR.
TATUO NOJIRI
BY
ATTORNEY

United States Patent Office 2,917,968
Patented Dec. 22, 1959

2,917,968

FIELD CHANGING MEANS FOR VIEWFINDER

Tatuo Nojiri, Todorokimachi, Setagayaku, Tokyo, Japan, assignor to Canon Camera Company, Inc., Otaku, Tokyo, Japan, a corporation of Japan Application May 23, 1956, Serial No. 586,819

Claims priority, application Japan September 13, 1955

5 Claims. (Cl. 88—1.5)

This invention relates to field changing and magnification varying means for viewfinders of cameras especially cinematographic cameras.

An object of this invention is to obtain a mask size changing means in proportion to the focal length of interchangeable lenses by providing a mask changeable in several stages on the focal plane of the eyepiece lens of a real image type viewfinder and a numerical value indicator of the focal length of the interchangeable objective operatively connected with the mask size changing means.

Another object of this invention is to obtain a field changing means for a viewfinder by inserting a variable magnification optical system on the optical axis of the viewfinder in such manner that the variable magnification system is changed in several stages and at the same time a numerical value indicator of focal length of the interchangeable objectives corresponding to the field magnification obtained by the viewfinder is indicated.

This invention is applicable to still cameras, but most markedly demonstrates its characteristic particularly for cinematographic camera employing a system of interchangeable lenses when used in combination with a multi-stage field mask variable means.

To explain more particularly, a field mask variable in several stages is provided on the focal plane of an eyepiece lens of a real image finder and the lens system of variable magnification in several stages is inserted on the front part of the viewfinder to determine the desired field and simultaneously to indicate the focal length of an objective suitable for use with the particular field of the viewfinder by a focal length indicator coupled to the variable magnification means. When variable mask means are combined with a variable magnification system according to the present invention, a variable magnification viewfinder of remarkably wide range will result.

A clearer concept of the scope and purpose of this invention will be obtained from the following description, taken in connection with the attached drawing, in which:

Fig. 1 is a plan view of an illustrative embodiment of a viewfinder with combined field mask changing mechanism and variable magnification means in accordance with the invention, partially in section;

Fig. 2 is likewise a plan view of the embodiment of Fig. 1 with portions of the upper and cover members removed or broken away, and with a greater portion in section than in Fig. 1;

Fig. 3 is an elevation from the rack and pinion side thereof;

Fig. 5 is a section on line V—V of Fig. 1;

Fig. 6 is a perspective, partially broken away, showing the details of the interconnection of the mask and its displacement means.

Figure 4:
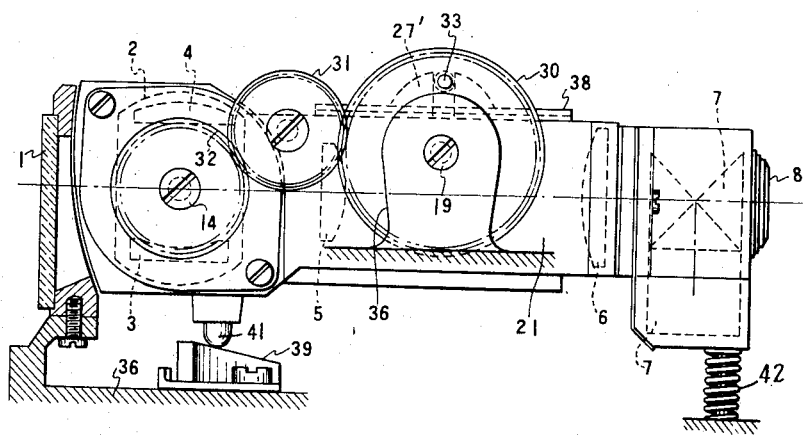
Fig. 4 is an elevation from the gear drive side thereof.

In Figs. 1 and 2, 1 is an objective window, 2 is a Galilean variable magnification system comprising a concave lens 3 and a convex lens 4. 5 is an objective lens. 6 is a field lens, 7 is an image erecting prism, and 8 is an eyepiece lens. A mask 12 is inserted at the focal plane of the eyepiece lens 8 in front of prism 7. The mask 12 comprises, for example, a unit size mask 9 in the form of an aperture in the guide plate 13, a half-size mask 10 and a one-third size mask 11 as best seen in Fig. 6. These latter masks for field reduction 10 and 11 are painted frames on a transparent plate 12 reciprocatable in the guide plate 13 to be centered about the optical axis of the viewfinder.

The table given below shows the relation between the variable magnification optical system 2 rotated 90° respectively on its shaft 14 and the magnification factors for inversed Galilean optical system, for direct view, and for Galilean system, which are, respectively 0.5, 1 and 2:

| mask | 1 | ½ | ⅓ |
|---|---|---|---|
| Magnification: | | | |
| 0.5 | 6.5 | 13 | 20 |
| 1 | 13 | 25 | 38 |
| 2 | 25 | 50 | 76 | in which table the numerals other than those for "mask" and for "magnification" are in millimeters. It follows therefore that if the magnification is 1, image for the field of view corresponding to the standard lens for the cinematographic camera in this embodiment, the 13 mm.-focal length is represented by the mask 9, while a similar image for a cinematographic camera having 25 mm.-focal length by the mask 10 and that of a 38 mm.-focal length by the mask 11, or more particularly, each image in proportion to the corresponding focal length, is respectively formed on the viewfinder. When the size of the mask is fixed at 1 and by selecting the variable power optical system in three stages, each image corresponding to lenses having focal lengths of 6.5 mm., 13 mm. and 25 mm. respectively is obtained within the same mask. By way of further examples: a viewfinder image is obtainable on the same sized mask so as to make a wide angle lens having a focal length of 6.5 mm. suitable for use when the unit mask is combined with a magnification of 0.5 as when a lens of 13 mm. focal length, which is a standard for cinematographic purposes, is used with the unit mask and a magnification of 1.0 (direct viewing). with the mask size ½ and a magnification of 2, the image formed through the instant viewfinder is such that a telephoto lens of 50 mm. focal length may be used. It is obvious therefore that by combining the masks with a variable magnification optical system, a viewfinder of variable magnification type adaptable to various lenses within the range of focal lengths from 6.5 mm. to 76 mm. may be constructed.

Figure 7:
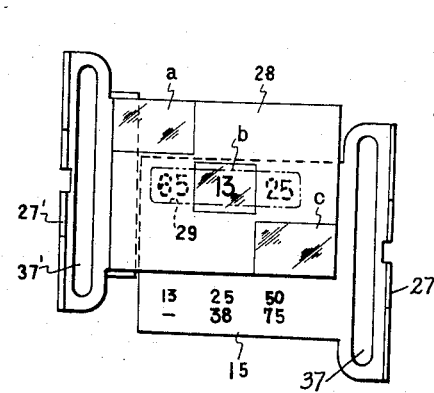
Figs. 7 and 8 each show a plan view of the focal length indicator members in different positions relative to each other.

Now referring to Figs. 1 to 3 on one side of a camera housing 16, a knob 18 (also serving as a pinion in the embodiment shown in the drawing) is fixed to the camera housing 16 or to a frame plate rotatably on stub shaft 19. Below the bottom of a viewfinder frame 21, a rack 20 meshing with the pinion 18 is provided to permit reciprocation thereof along the bottom of the viewfinder casing 21, and a cam 22 is integral with an end region of rack 20. A holder 12' of the mask 12 is slidable in the guide plate 13 and is biased to the left (in Fig. 4) by a spring 24 acting on a downward projection 25 from the mask holder 12'. A lever 23, pivoted about projection 23p from the viewfinder bottom, has its one end 23' engaged to projection 25 under the action of spring 24 so that its other end 23² constantly engages rack cam 22, as shown in Fig. 6. A pin 26 projects from the inner face of knob 18 to project into a forked end region 27 formed at the upwardly bent end of indicator plate 15. In Figs. 1 and 2 the transparent plate 12 is retracted against the tension of biasing spring 24 to use the unit size mask 9. When the knob 18 is rotated, the cam 22 moves toward the right and the lever 23 swings clockwise to urge the transparent plate 12 toward the optical axis of the viewfinder by means of spring 24 thus to position both masks 10 and 11 centralized within mask 9. As the knob 18 is rotated, the indicator plate 15 also shifts simultaneously with the sliding movement of the mask 12 from the position shown in Figures 1 and 2 to the position in which the indication 25
38 appears in the transparent window b of the reading plate 28, as best seen in Fig. 7. It will be noted therefore that in the present embodiment the numerical value of 13 representing 13 mm. focal length by means of unit size mask and unit magnification, disappears from the transparent window b and now the numeral 25
38 appears in the reading window. To say more particularly it indicates that a lens having a 25 mm. focal length is suitable for the viewfinder image viewed through the half size mask 10 and a lens having a 38 mm. focal length is suitable for the viewfinder image viewed through the one-third size mask 11. It will be noted that instead of displacing the indicator plate 15 in the above mentioned embodiment, only the reading plate 28 may be displaced while keeping the indicator plate 15 immovable. Thus the desired structure is obtained by relative displacement of either one or the other.

The reading plate 28 also moves by means of a pin 33 provided on a knob 30 when the power of the variable magnification system 2 is changed through the gears 31 and 32 by rotating the knob 30, symmetrically positioned relative to the knob 18 on the opposite side of the camera housing, since the instant embodiment is a combination with a variable magnification optical system. The knob 30 is rotatable about stub shaft 19' aligned with stub shaft 19 for knob 18 and likewise supported on the frame plate 36. In the present embodiment the numeral 6.5 will be indicated in the transparent window a when the magnification is 0.5, and the numeral 25 will be indicated in the transparent window c when the magnification is 2 provided indicator plate 15 is positioned as shown in Figs. 1, 5 and 6. It will best be arranged that the parts, other than the transparent windows a, b and c of the reading plate 28 are made opaque or half-transparent or suitably colored so that the numerals, other than those indicated in certain of the windows a, b, or c, for instance 6.5 and 25 in Figs. 7 and 8, can be distinguished. The transparent windows a, b and c of the reading plate are positioned thereon in non-overlapping and mutually displaced relation, both laterally and longitudinally. Thus, as clearly shown in Figures 7 and 8, window a is to the upper right, window b in the central middle, and window c in the lower right, region of plate 38.

In Figs. 1, 2 and 3, 34 is an upper guide of the reading plate 28 having the reading window 29 and its fixing screws 35 and 35' serve as guide member for the indicator plate 15 and the reading plate 28, screw 35 extending into an elongated groove 37 of the indicator plate 15, while screw 35' extends into elongated aperture 37' of reading plate 28. The pin 33, on knob 30, engages the forked end 27' of the reading plate 28, and thus moves it in the same manner as pin 26 on knob 18 moves indicator plate 15. In Figures 3 and 4 39 is a cam which operatively couples to a focusing mechanism of the objective lens and functions to correct parallax between the finder and the objective by tilting the finder frame 21 around its tilting axis 19.

This invention thus offers a field mask changing device for viewfinders which is smoothly operatable by simple structure and, at the same time, numerical values representing the focal length of objectives suitable for the field obtained through the mask selected by the rotation of knobs 18 and 30 are indicated.

Now explaining about, for example, a cinematographic camera having a set of three interchangeable objectives comprising a wide angle lens of 6.5 mm. focal length, a standard lens of 13 mm. focal length, and a telephoto lens of 25 mm. focal length, such focal lengths correspond to the values gives in the column of the mask 1 of the table hereinabove. It thus follows that a finder image in proportion to the focal length of each interchangeable objective is formed in the same size mask 9 when the variable magnification system 2 is so varied as to obtain 0.5 magnification of the inverse-Galilean optical system, unit magnification 1, that is, by rotating the turret mounting convex lens 4 and concave lens 3 through 90° so that the optical axis of the Galilean system is perpendicular to the viewfinder axis, see Figures 3 and 4, and the magnification of 2 by rotating the turret an additional 90° that is, the reverse of 0.5 magnification. Thus, when the indicator plate 15, with numerical reference characters of 6.5, 13 and 25 arranged laterally thereon, is positioned just below the reading window 29. By turning the knob 30 to change the magnification power of the variable optical system to unit magnification as shown in Figs. 1 and 4, the reading plate 28 simultaneously shifts by the pin 33 and the forked end 27' thus the central transparent window b comes over the numerical value 13 so as to indicate a viewfinder image corresponding to a standard lens of 13 mm. focal length. On the contrary, by observing the image of the object through the viewfinder a desired magnification is given by varying the magnification and by reading the numerical value displayed in window b in this case, for instance, 13, the viewfinder works so as to suggest that an interchangeable lens of 13 mm. focal length is suitable.

Figure 8:
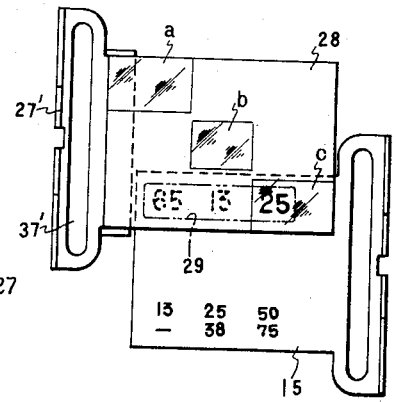

When the knob 30 is turned to change the variable magnification power from unity to 2, the reading plate 28 shifts upwardly in Figure 7 so that transparent window c displays the numerical value 25 as shown in Fig. 8. Further when a set of interchangeable objectives having focal lengths of 13, 25 and 50 respectively, is mounted on the camera, the numerical value column 13 25 50
 38 75 of the indicator plate 15 comes just below the reading window 29. This is accomplished by rotation of the knob 18 and its movement of rack 20 with the cam 22 and the action of lever 23 and spring 24, as above described. When the size changing mask 12 is in the position as shown in Fig. 1, the mask 9 is maintained in the position represented by the row 6.5 13 25 of the above mask-magnification table, and thus when the rack 20 is shifted by the geared knob 18 along a rail 40 towards the right in Fig. 1, the lever 23 pivots clockwise under the tension of spring 24, and the size changing mask 12 shifts along a guide groove 13 to the position shown in Figure 6 in which the masks 10 and 11 marked on the transparent member 12 show respectively sizes of the mask ½ and ⅓ of unit size. Simultaneously with the advance of the size changing mask 12, the indicator plate 15 also shifts by a pin 26 and the numerical value column 13 25 50
--, 38, 75 shifts just below reading window 29, to indicate that the interchangeable lens system of said 13, 25, 50 is to be used for the half-size mask 10 and lenses of the focal-length system of 38, 75 are to be used for one-third size mask 11. Thus this invention offers to attain a variable magnification in remarkably wide range by the combination of the variable magnification optical system 2 with the unit mask 9 and the size changing mask 12 in this manner. The cam 39 shown in Figures 3 and 4, is operatively coupled with the focusing means of the objective so that the viewfinder frame 21 is tilted around its shaft 19 by the interaction of cam 19 and a projection 41 extending downwardly from the viewfinder frame 21 which is continuously pressed against the cam surface by a coiled spring 42 tensioned between the camera housing and the bottom of the viewfinder frame, to correct parallax between the optical axis of the viewfinder and the optical axis of the objective.

From the above explanation it is quite obvious that this invention is remarkably useful for cameras having interchangeable lens systems, particularly for cinematographic cameras, by having the viewfinder clearly indicate which objectives of appropriate focal lengths should be used, since the viewfinder according to this invention indicates the focal lengths of the objectives corresponding to the finder image as the result of the positive coupling between the variable magnification optical system 2 and the size mask 12.

It should be noted that this variable magnification optical system can be used not only for a Galilean system of magnification variable in three stages but also for a Galilean system of magnification variable in four stages or for similar magnification variable system in two stages in which one of two lenses is reciprocated.

What I claim is:

1. A parallax-free variable magnification viewfinder for photographic cameras comprising an elongated casing, a pair of aligned stub shafts pivotally supporting the casing at an intermediate region on the camera body, a cylindrical lens turret, at least one pair of lenses mounted in the cylindrical surface of the turret, the lenses of each pair being mounted diametrically opposite each other, the cylindrical surface having a pair of diametrically opposite apertures circumferentially spaced from the lens pair, an optical system including an eye piece in the casing of which the optical axis extends in the direction of the longest dimension of the casing and passes through both the center of rotation and the cylindrical surface of the turret, a rotatable shaft integral with the lens turret supported in the casing perpendicular to the optical axis, gearing interconnecting one of the stub shafts and the rotatable turret shaft of which a first gear is rotatably on one stub shaft, a rack slidably supported on the camera body parallel to the optical axis, a second gear rotatable on the other stub shaft and meshing with the rack, a channel guide extending across the optical axis at the focal plane of the eyepiece and having an aperture therethrough defining a mask of unit size at the focal plane, a transparent plate slidable within the channel, markings on the transparent plate defining framing masks of less than unit size thereon, a spring biased lever pivoted to the finder casing of which one end engages the rack cam and its other end is interconnected with the transparent plate, the lever under its spring bias normally completely retracting the transparent plate from the optical axis by engagement of its one end to the high region of the rack cam, an indicator plate positioned above and parallel to the optical axis, and slidable parallel to the optical axis, the indicator plate carrying markings representative of the focal lengths of objectives selectively usable in the camera, means coupling the second gear with the indicator plate to slide the indicator plate on rotation of the second gear, a reading plate having a plurality of mutually displaced transparent areas of such dimensions as to be registerable with but one at a time of the markings on the indicator plate, a cross-member affixed to the casing above both the indicator and reading plates and having an aperture of such dimensions as to expose at one time but a single transparent area, and means coupling the reading plate and the first gear to position a particular transparent area of the reading plate in alignment with the aperture of the cross-member on manual rotation of the first gear to rotate the turret to align selectively a lens pair or the aperture pair of the turret with the optical axis of the optical system, the means coupling the second gear with the indicator plate comprising a first end member of L-section integral with the end of the indicator plate adjacent to the second gear, the first end member having a first elongated slot in its upright leg and a first elongated aperture in its base portion, a first pin on the second gear extending through the first elongated slot adapted on rotation of the second gear to slide the indicator plate parallel to the optical axis, and a second guide pin extending from the casing through the first elongated aperture of the base portion of the first end member to permit sliding and to prevent lifting of the indicator plate, and the means coupling the reading plate and the first gear comprise a second end member of L-section integral with the end of the reading plate adjacent to the first gear, the second end member having a second elongated aperture in its base portion, a third pin on the first gear extending through the second elongated slot adapted on rotation of the first gear to slide the reading plate parallel to the optical axis, and a fourth guide pin extending from the casing through the second elongated aperture of the base portion of the second end member to permit sliding and prevent lifting of the reading plate.

2. In a photographic viewfinder comprising a finder casing tiltable about a horizontal shaft to compensate the parallax between the finder and camera objective, a spring to bias the finder casing to a predetermined direction about the horizontal shaft, a first optical system of real image type comprising an objective lens, a field lens, an image erecting prism and an eyepiece optically aligned to the finder casing, a second optical system of Galilean type rotatable about a shaft on the finder casing in optical alignment with the first optical system, a first gear rotatable on the tilting shaft, a gearing interconnecting the second optical system rotating shaft and the first gear, a rack slidably supported on the finder casing parallel to the first optical axis, a cam integral with the rack, a second gear rotatable on the tilting shaft and meshing with the rack; a transparent, reciprocable plate perpendicular to the first optical system at the focal plane of the eyepiece carrying masking delineations to define the finder fields; a spring biased lever pivoted to the finder casing having one end engaging the rack cam and the other end interconnected with the transparent plate, an indicator plate slidably supported on the finder casing parallel to the first optical axis, and having markings representative of the focal lengths of objectives selectively usable in the camera, a reading plate having transparent areas slidably supported on the finder casing parallel to the first optical axis, a first pin-and-slot mechanism interconnecting the first gear and the reading plate, a second pin-and-slot mechanism interconnecting the second gear and the indicator plate, an apertured pressure plate located over the indicator plate and reading plate, a second cam operated by the focusing of the camera objective, and a cam follower engaging the second cam to tilt the finder upon focusing of the camera objective; the manual rotation of the first gear selectively aligns the Galilean optical system to change the optical power of the finder system while sliding the reading plate, and the manual rotation of the second gear selectively reciprocates the transparent plate within the focal plane of the eyepiece while sliding the indicator plate in such a manner that the relative positions of the indicator plate and the reading plate indicates the focal length of the objectives to obtain the image viewed through the delineated markings of the transparent plate of the viewfinder.

3. A viewfinder according to claim 2 in which regions of the reading plate adjacent the transparent area are color tinted.

4. A viewfinder according to claim 2 in which regions of the reading plate adjacent the transparent area are frosted.

5. A viewfinder according to claim 2 in which regions of the reading plate adjacent the transparent area are opaque.

References Cited in the file of this patent

UNITED STATES PATENTS

| | | |
|---|---|---|
| 2,058,813 | Mitchell | Oct. 27, 1936 |
| 2,123,494 | Barnack | July 12, 1938 |
| 2,364,413 | Wittel | Dec. 5, 1944 |
| 2,552,940 | Cornut | May 15, 1951 |

FOREIGN PATENTS

| | | |
|---|---|---|
| 368,603 | Great Britain | Mar. 10, 1932 |
| 890,751 | Germany | Sept. 21, 1953 |
| 1,017,937 | France | Dec. 22, 1952 |